(12) United States Patent
Manders

(10) Patent No.: US 7,673,734 B2
(45) Date of Patent: Mar. 9, 2010

(54) APPARATUS AND METHOD FOR POSITIONING ADVANCING FOOD PRODUCTS

(75) Inventor: Wilhelmus Josephus Maria Manders, Boekel (NL)

(73) Assignee: Stork Townsend B.V., Oss (NL)

( * ) Notice: Subject to any disclaimer, the term of this patent is extended or adjusted under 35 U.S.C. 154(b) by 112 days.

(21) Appl. No.: 11/577,080

(22) PCT Filed: Oct. 11, 2005

(86) PCT No.: PCT/NL2005/050013

§ 371 (c)(1), (2), (4) Date: Jan. 4, 2008

(87) PCT Pub. No.: WO2006/041298

PCT Pub. Date: Apr. 20, 2006

(65) Prior Publication Data

US 2009/0026043 A1    Jan. 29, 2009

(30) Foreign Application Priority Data

Oct. 13, 2004   (NL)   .................................. 1027231

(51) Int. Cl.
*B65G 47/26*   (2006.01)

(52) U.S. Cl. .................. 198/456; 198/457.01; 198/598
(58) Field of Classification Search ................ 198/416, 198/457.01, 457.05, 598, 456
See application file for complete search history.

(56) References Cited

U.S. PATENT DOCUMENTS

| 1,636,235 | A | * | 7/1927 | Knowles | ..................... 198/416 |
| 2,416,690 | A | * | 3/1947 | Hardy | .................. 198/457.01 |
| 3,174,632 | A | * | 3/1965 | Eynon | ........................ 198/456 |
| 3,850,289 | A | * | 11/1974 | Behr et al. | .................. 198/456 |
| 5,382,154 | A | * | 1/1995 | Morikawa et al. | ........... 198/456 |
| 5,441,142 | A | * | 8/1995 | Schneider | .................... 198/456 |
| 6,863,173 | B2 | * | 3/2005 | Bennett | ...................... 198/416 |

* cited by examiner

*Primary Examiner*—James R Bidwell

(57) ABSTRACT

A positioning element for positioning advancing food products includes an engaging member with a contact side for engaging on the products for positioning, and a displacing assembly connecting to the engaging member for intermittently displacing the engaging member in a direction which encloses an angle with the contact side of the engaging member. The engaging member of the positioning element is also provided with at least two engaging sides remote from each other to exert a positioning effect in two directions. Also disclosed is a method for positioning food products.

13 Claims, 3 Drawing Sheets

APPARATUS AND METHOD FOR POSITIONING ADVANCING FOOD PRODUCTS

BACKGROUND OF THE INVENTION

The present invention relates to a positioning element for positioning advancing food products according the preamble of claim 1. The invention also relates to an apparatus for positioning food products, comprising such a positioning element. The invention finally also relates to a method for positioning food products, according the preamble of claim 13.

The positioning of food products advancing on a conveyor has heretofore usually taken place by means of guide elements which are disposed at a fixed position adjacently of and above the conveyor. The advancing food products, for instance (semi-products of) sausages in particular, which are situated at a location whereby they are forced up against the products placed at a fixed position, will thus be pushed aside by the guide element disposed at a fixed position. Such a solution can be manufactured in very advantageous and robust manner, and also requires little maintenance and is not susceptible to malfunction. A drawback of this existing method of positioning food products advancing on a conveyor is that some of the products for positioning deform under the influence of the guide disposed at a fixed position (sausages can thus for instance be bent). Another drawback is that some of the food products may only be displaced temporarily; as soon as the product is no longer in contact, in a number of cases it may return, to a greater or lesser extent, to the starting position before it was engaged by the guide element disposed in fixed position.

The Japanese patent JP 60-102316 discloses a device of collecting and arranging transferred objects into a single line. The objects are moved by a transporting conveyor and will contact due to there forward movement with right and left guide members which swing in the wide direction of the transporting conveyor. The right and left guide members are moved by means of a power mechanism to arrange the objects gradually into a smaller number of lines. Finally all the objects are arranged into one line at the final outlet and sent into a passage. Due to this construction objects being conveyed in plural lines can be arranged into a single line. However this construction is only applicable for products to be lined in a single row and has furthermore the drawback that is requires substantial space.

The invention therefore has for its object to provide means and a method for positioning advancing food products in plural lines, whereby the above described drawbacks of the prior art can be alleviated or avoided.

SUMMARY OF THE INVENTION

The present invention provides for this purpose a positioning element for positioning advancing food products, according claim 1. The positioning element can thus be used for arranging between two rows of advancing food products and to exert a positioning effect in two directions (i.e. in relation to two adjoining rows of food products). In addition to the double effect of the positioning element according the invention, this double effect, the positioning of two rows of food products, is realised without a substantial increase in the costs for the two-sided action of the positioning element over the one sided acting positioning elements according the prior art. The invention furthermore provides the option of positioning, including separating, rows with a small spacing or even partial overlap of the elongated food products. Further explanation is provided below in respect to the separating effect of the positioning element according invention. Furthermore the positioning element has the advantage that the engaging member can be pressed for a relatively short time against the products for positioning and then released there from again. A food product, such as for instance a sausage, can thus be forced in a desired direction with one or with multiple successive strokes (shifting, pushing) without the product lying over or against a guide element for an excessive time. The positioning element according to the invention enables to position (align) less form-retaining food products without this having to result in deformation of the food products. The chance of the products returning to the starting position after the positioning can also be reduced with this positioning element.

The U.S. Pat. No. 3,067,558 discloses a sausage packaging machine comprising a substantially horizontal endless chain conveyor having an upper reach for receiving individual sausages and for conveying the sausages. On opposite sides of the chain conveyor a pair of converging endless guide belts (C) are located for aligning the sausages on the chain conveyor. Also this document is not providing a solution for aligning plural rows of food products.

The U.S. Pat. No. 6,454,257 discloses an article jogging apparatus for the lateral straightening of sheet material located on a conveyor including a pair of vertically opposed timing belts. One belt being adjustable per product width as well as stream throat, the other belt oscillating between a reference and a thrown position to realign those articles of the stream that are out of alignment. Once again this document is not providing a solution for aligning plural rows of products.

In a preferred embodiment the engaging member is provided with a substantially flat engaging side. With such a flat engaging side the chance of damage/deformation of the products is minimal and it is moreover easy to clean such an engaging member.

In an advantageous variant, the engaging member can be displaced rotatably about a fixed rotation shaft. This rotation shaft can for instance run parallel to a substantially flat engaging side, or can even be situated in the plane in front of the engaging side. The shaft can also be advantageously located on a front side of the positioning element, wherein the displacing means can conversely engage on the engaging member at a distance from the rotation shaft. This construction can also be given a simple and reliable form. On the other hand it is also possible as an alternative to give the rotation shaft a translatable form, or to make it adjustable such that the angle enclosed by the rotation shaft and the active surface of the conveyor is adjustable. Depending on the circumstances, the positioning action of the engaging member can thus be adjusted.

In order to nevertheless bring into a correct position the products for positioning which lie too far outside the alignment limits to be realized, it is advantageous if the engaging member is provided with a height which gradually increases in the direction of transport of the products for positioning. Such a positioning element is provided with a contact edge with a height increasing in the direction of transport over which the food products can slide upward as they advance. In normal conditions the intermittent movement of the engaging member will however ensure that, during each reciprocal stroke of the contact member, the food products shift some distance in the direction in which the products must eventually be positioned. It can thus also become possible for instance to completely separate from each other (align with a fixed spacing) two rows lying adjacently of each other with overlap.

The displacing means can be formed by a rotatable cam roller which is coupled to the engaging member via at least one rod. Such displacing means are easy to manufacture and maintain, although diverse other displacing means can also be applied, such as for instance pneumatic or hydraulic cylinders.

The invention also provides an apparatus for positioning advancing food products, according claim 6. The movement can herein be parallel to the part of the conveyor supporting the food products. For the advantages of such an apparatus reference is made to the above stated advantages in respect of the positioning element according to the invention; these include being simple, robust, little susceptible to malfunction, no deformation of the products, easy to clean and so on.

The positioning element can also be coupled for driving purposes to the conveyor, for instance in that a roller engages on the conveyor such that this latter is driven thereby, which roller then brings about a displacement of the engaging member, optionally via transmission means. Such a drive makes a separate power source for bringing about intermittent movement of the engaging member unnecessary, and it is also very simple to thus synchronize the movements of the conveyor and of the engaging member. If the positioning element is displaceable relative to the conveyor such that in the direction of transport the end position of the engaging member reaches further in the situation in which the food products are being shifted, it becomes possible to urge the food products to the desired position in successive steps. This results in a controlled process of positioning with predictable results.

When the conveyor is adapted to displace at least two rows of food products, between which rows of food products the displaceable engaging member of the positioning element is displaceable, a single positioning element can provide for separation of the rows. This results in a good utilization of the available space and means.

In the case that the apparatus is provided with at least two positioning elements disposed on opposite sides of a row of products for positioning as part of the double row of products as disclosed, it becomes possible to fully control the position of these products in one direction (perpendicularly of the direction of transport). It becomes possible to displace the products irrespective of the direction in which they have an undesirable starting position. In order to hold the products in the direction of movement, it is desirable to provide the conveyor with protruding elements engaging on the food products. The force exerted on a food product with a positioning element can thus also be controlled; there is after all less, or no, possibility of the food product displacing in an undesired direction.

In order to prevent the positioning element from jamming or damaging the conveyor, it is desirable that the engaging member is intermittently displaceable at a distance from the side of the conveyor supporting the food products.

The invention moreover provides a method for positioning advancing food products, according claim 12. Due to this method the products will be placed a minimal distance apart and a double positioning effect can thus be obtained with a single engaging member. At least some of the products for positioning can be carried upward over the engaging member and then be released again from the engaging member by the intermittent movement of the engaging member. This makes it possible to also position products which are situated partly on the opposite side (being the wrong or undesirable side for the product in question).

It is also possible for a row of successively placed food products as part of the double row of products to be positioned by the double positioning engaging member to be engaged on opposite sides by engaging members moving reciprocally in intermittent manner. The position of the food product in the direction perpendicular to the direction of transport (and parallel to the conveyor) is now completely controllable; a product can be engaged selectively by one of the two engaging members and urged into the desired position.

BRIEF DESCRIPTION OF THE DRAWINGS

The present invention will be further elucidated on the basis of the non-limitative exemplary embodiments shown in the following figures. Herein.

DETAILED DESCRIPTION OF A PREFERRED EMBODIMENT OF THE INVENTION

Figure 1:
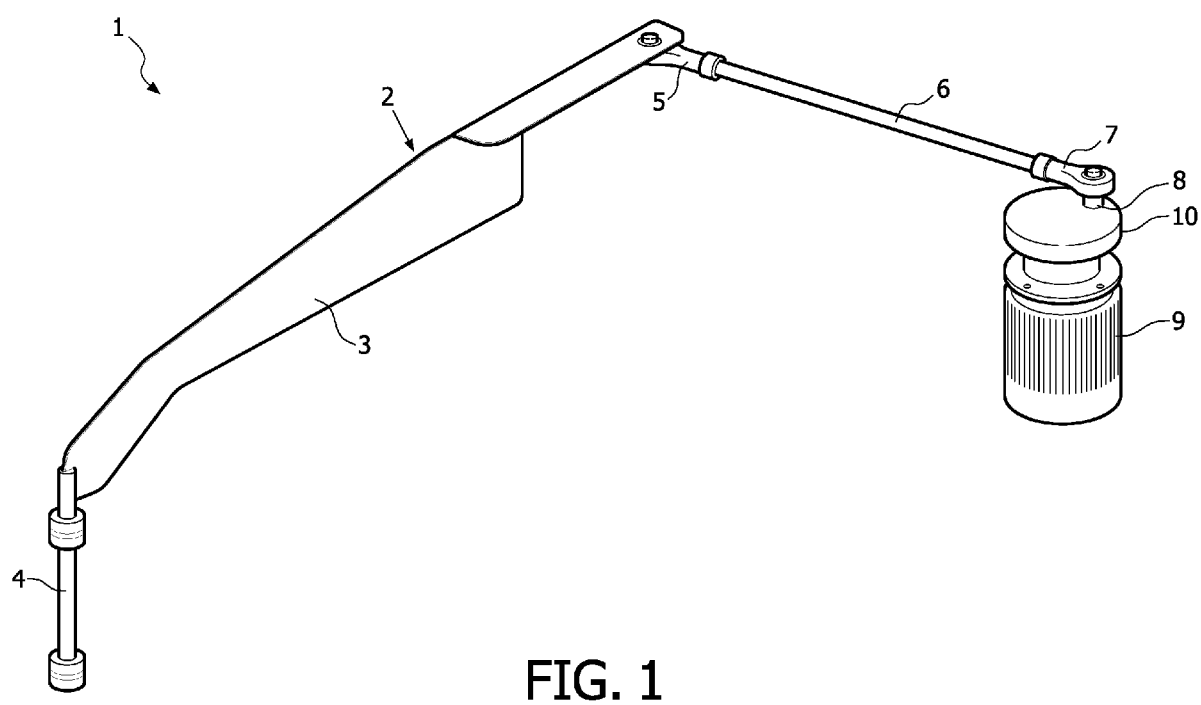
FIG. 1 shows a perspective view of a positioning element according to the invention.

FIG. 1 shows a positioning element 1 with an engaging member 2 which is provided with a contact side 3 for engaging on products for positioning, which are not shown in this figure. Positioning element 1 is provided with a rotation shaft 4 which can support in mounted manner on the fixed world. On the side of engaging member 2 remote from rotation shaft 4 a coupling rod 6 is connected rotatably thereto via a coupling piece 5. Via a second coupling piece 7 the side of coupling rod 6 remote from positioning element 1 engages rotatably on a cam 8 of a disc 10 driven by an electric motor 9. Through rotation of disc 10 the engaging member 2 will begin to make a reciprocal swinging movement around rotation shaft 4.

Figure 2:
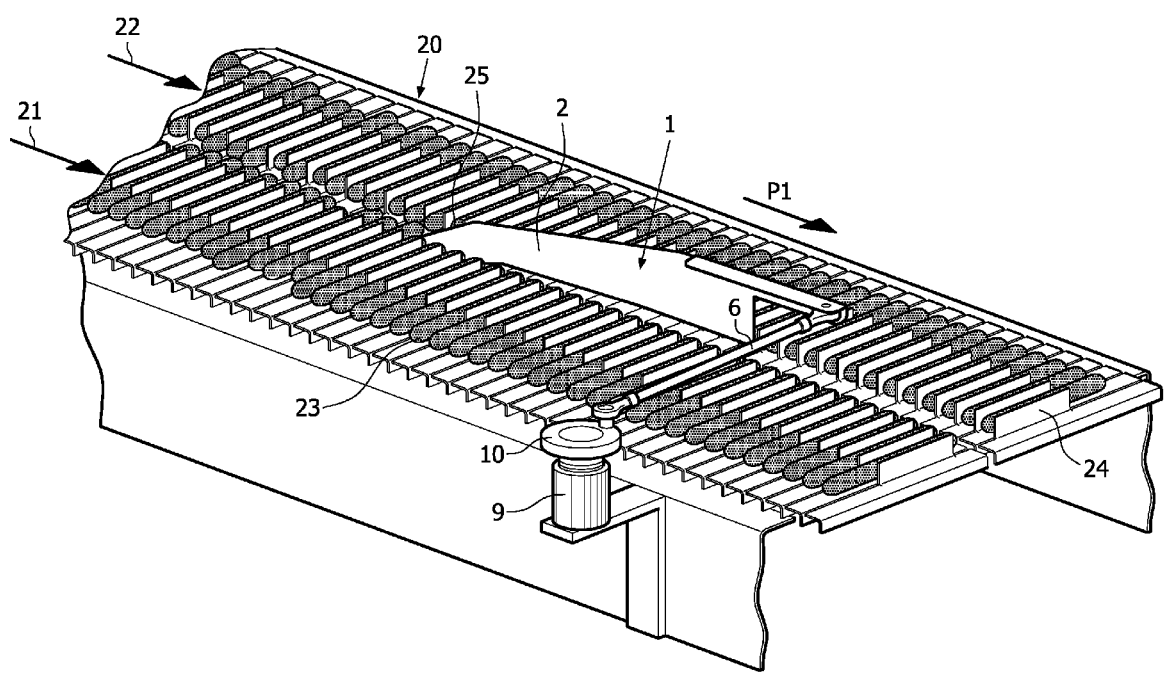
FIG. 2 shows a perspective view of a positioning apparatus according to the invention with a double row of sausages for aligning.

FIG. 2 shows a perspective view of positioning apparatus 1 according to FIG. 1 in combination with a conveyor 20 with which two rows 21, 22 of sausages 23 for aligning are displaced in direction of transport P1. Conveyor 20 is provided with upright parts 24 between which the sausages 23 are placed. Sausages 23 therefore have only one degree of freedom, parallel to upright parts 24. Upon initial feed the sausages 23 are not yet properly aligned in two rows; they then still have a more or less random orientation in the direction parallel to upright parts 24. This random orientation of sausages 23 even goes so far that two adjacent sausages 23 may be in contact with each other or may even be partly overlapping. The separation of sausage pairs located successively on conveyor 20 may be at a different location in each case, which makes it difficult to separate the two rows 21, 22 of sausages 23 for aligning.

When sausages 23 reach the engaging member 2 of positioning element 1, some of the sausages 23 will rise over an upper edge 25 of engaging member 2 while other sausages 23 are not initially touched by engaging member 2. Due to rotation of the disc driven by electric motor 9, engaging member 2 will swing reciprocally in intermittent manner via coupling bar 6. The swing of engaging member 2 will become increasingly greater as seen in direction of transport P1, so that the sausages (depending on the transport speed relative to the frequency of the intermittent swinging movement and the starting position of a specific sausage 23) are placed in a number of steps in the desired (aligned) position by engaging member 2. The sausages 23 which slide upward over upper edge 25 at first contact with engaging member 2 will be removed from upper edge 25 in one or more steps by the intermittent swinging movement of engaging member 2. It is thus possible to also separate fragile sausages 23 (or other delicate food products) which are oriented in overlapping and/or otherwise complex manner.

Figure 3:
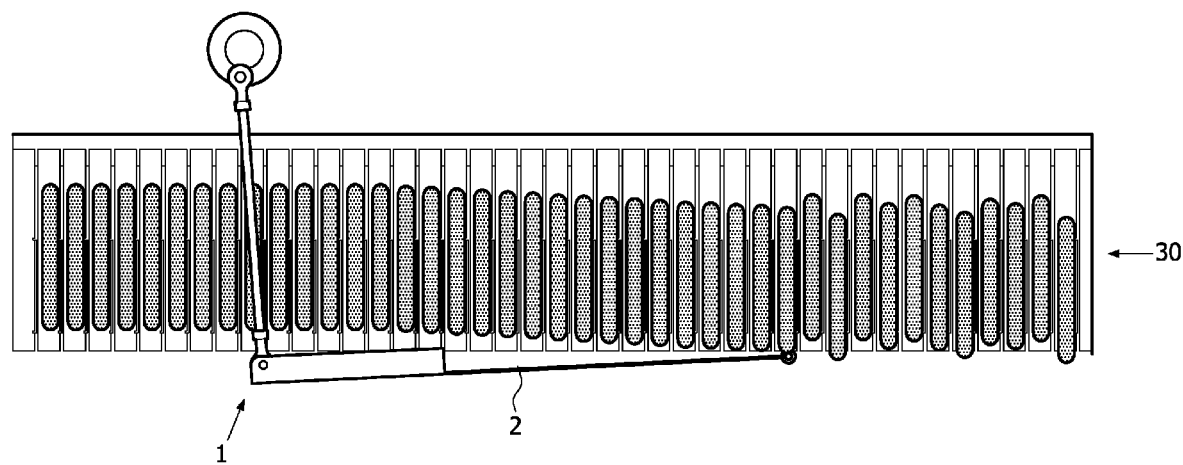
FIG. 3 is a top view of a part of the positioning apparatus for aligning only showing a single row of sausages.

FIG. 3 shows a top view of a partial view on positioning apparatus 1, the engaging member 2 of which engages on only a single shown row of sausages 30 for alignment on one side, the second row is not shown in of sausages 30 is not shown in this figure.

What is claimed is:

1. Positioning element (1) for positioning advancing food products (23), comprising:
    an engaging member (2) with a contact side (3) for engaging on the products (23) for positioning, and
    displacing means (5, 6, 7, 8, 9, 10) connecting to the engaging member (2) for intermittently displacing the engaging member (2) in a direction which encloses an angle with the contact side of the engaging member (2),
    characterized in that the engaging member (2) is provided with at least two engaging sides (3) remote from each other, to exert a positioning effect in two directions and a fixed rotation shaft that rotatably holds the engaging member (2).

2. Positioning element (1) as claimed in claim 1, characterized in that the engaging member (2) is provided with a substantially flat engaging side (3).

3. Positioning element (1) as claimed in claim 1, characterized in that the engaging member (2) can be displaced rotatably about a fixed rotation shaft (4).

4. Positioning element (1) as claimed in claim 1, characterized in that the engaging member (2) is provided with a height which gradually increases in the direction of transport of the products (23) for positioning.

5. Positioning element (1) as claimed in claim 1, characterized in that the displacing means (5, 6, 7, 8, 9, 10) are formed by a rotatable cam roller (8, 10) which is coupled to the engaging member (2) via at least one rod (6).

6. Apparatus for positioning advancing food products (23), comprising:
    a positioning element (1) as claimed in any of the foregoing claims, and
    a conveyor (20) for successively displacing food products (23), wherein at least a part of the positioning element (1) is displaceable in a direction with a movement component perpendicular to the direction of transport of the conveyor (20).

7. Apparatus as claimed in claim 6, characterized in that the positioning element (1) is coupled for driving purposes to the conveyor (20).

8. Apparatus as claimed in claim 6, characterized in that the positioning element (1) is displaceable relative to the conveyor (20) such that in the direction of transport the end position of the engaging member (2) increases in the situation in which the food products (23) are pushed up.

9. Apparatus as claimed in claim 6, characterized in that the conveyor (20) is adapted to displace at least two rows (21, 22) of food products (23), between which rows (21, 22) of food products (23) the displaceable engaging member (2) of the positioning element (1) is displaceable.

10. Apparatus as claimed in claim 6, characterized in that the conveyor (20) is provided with protruding elements (24) engaging on the food products (23).

11. Apparatus as claimed in claim 6, characterized in that the engaging member (2) is intermittently displaceable at a distance from the side of the conveyor (20) supporting the food products (23).

12. Method for positioning advancing food products (23), comprising the processing steps of:
    A) advancing in a direction of transport food products (23) placed at least substantially in two rows one behind the other, and
    B) intermittently moving an engaging member (2) reciprocally between the rows (21, 22) of successively placed food products (23) such that the food products (23) lying too close to the engaging member (2) are moved aside in a number of successive steps,
    characterized in that the engaging member (2) is moved reciprocally in intermittent manner between the two rows of food products (23) so that the products are placed a minimal distance apart.

13. Method as claimed in claim 12, characterized in that at least some of the products (23) for positioning are carried upward over the engaging member (2) and then released again from the engaging member (2) by the intermittent movement of the engaging member (2).

* * * * *